(12) United States Patent
Lopushansky et al.

(10) Patent No.: US 8,125,646 B2
(45) Date of Patent: Feb. 28, 2012

(54) APPARATUS AND METHODS FOR MONITORING COMBUSTION DYNAMICS IN A GAS TURBINE ENGINE

(75) Inventors: Richard Lopushansky, The Woodlands, TX (US); John Berthold, Salem, OH (US)

(73) Assignee: Davidson Instruments Inc., The Woodlands, TX (US)

( * ) Notice: Subject to any disclaimer, the term of this patent is extended or adjusted under 35 U.S.C. 154(b) by 1024 days.

(21) Appl. No.: 12/075,278

(22) Filed: Mar. 10, 2008

(65) Prior Publication Data
US 2008/0226443 A1   Sep. 18, 2008

Related U.S. Application Data

(60) Provisional application No. 60/905,700, filed on Mar. 8, 2007.

(51) Int. Cl.
G01B 9/02 (2006.01)
G01B 11/02 (2006.01)
(52) U.S. Cl. .......... 356/480; 356/519
(58) Field of Classification Search .......... 356/480, 356/519
See application file for complete search history.

(56) References Cited

U.S. PATENT DOCUMENTS

| | | | | |
|---|---|---|---|---|
| 4,037,751 | A * | 7/1977 | Miller et al. | 428/593 |
| 4,887,469 | A * | 12/1989 | Shoptaw | 73/861.77 |
| 5,247,597 | A | 9/1993 | Blacha et al. | |
| 5,920,670 | A | 7/1999 | Lee et al. | |
| 6,115,521 | A | 9/2000 | Tran et al. | |
| 6,430,337 | B1 | 8/2002 | Bergmann et al. | |
| 6,820,488 | B2 * | 11/2004 | Lenzing et al. | 73/705 |
| 6,854,899 | B1 | 2/2005 | Krah et al. | |
| 6,894,787 | B2 | 5/2005 | Youngner et al. | |
| 7,002,697 | B2 * | 2/2006 | Domash et al. | 356/519 |
| 7,134,341 | B2 * | 11/2006 | Girmonsky et al. | 73/579 |
| 7,173,713 | B2 | 2/2007 | Xu et al. | |
| 2002/0016536 | A1 | 2/2002 | Benni | |
| 2004/0086228 | A1 | 5/2004 | Rumpf et al. | |
| 2004/0182149 | A1 * | 9/2004 | Balin et al. | 73/290 V |
| 2004/0211187 | A1 * | 10/2004 | Catharine et al. | 60/772 |
| 2005/0036742 | A1 | 2/2005 | Dean, Jr. et al. | |
| 2009/0055071 | A1 * | 2/2009 | Way et al. | 701/100 |

OTHER PUBLICATIONS

Yoshino, T et al. "Fiber-Optic Fabry-Perot Interferometer and its Sensor Applications" IEEE Transactions on Microwave Theory and Techniques, Oct. 1982 MTT-30 No. 10, pp. 1612-1621.*
Int. Search Report, Jun. 24, 2008, Davidson Instruments Inc.
Yoshino et al., Fiber-Optic Fabry-Perot Interferometer and its Sensor Applications, IEEE Transactions on Microwave Theory and Techniques, Oct. 1982, vol. MTT-30, No. 10.

* cited by examiner

*Primary Examiner* — Patrick J Connolly
(74) *Attorney, Agent, or Firm* — McDonald Hopkins LLC

(57) ABSTRACT

Apparatus, methods, and other embodiments associated with monitoring combustion dynamics in a gas turbine engine environment are described herein. In one embodiment of a system for monitoring combustion dynamics in a gas turbine engine environment, the system includes a transducer and an optical fiber. The transducer is positioned within the gas turbine engine environment, and the transducer includes a diaphragm, a window, and a Fabry-Perot gap. The diaphragm has a reflective surface, and the window has a partially reflective surface. The Fabry-Perot gap is formed between the reflective surface of the diaphragm and the partially reflective surface of the window. The optical fiber is positioned proximate to the window and directs light into the Fabry-Perot gap and receiving light reflected from the Fabry-Perot gap.

27 Claims, 4 Drawing Sheets

APPARATUS AND METHODS FOR MONITORING COMBUSTION DYNAMICS IN A GAS TURBINE ENGINE

CROSS-REFERENCE TO RELATED APPLICATIONS

This application claims priority from U.S. Provisional Patent Application No. 60/905,700 entitled "METHODS AND APPARATUS FOR MONITORING GAS TURBINE COMBUSTION DYNAMICS USING TEMPERATURE TOLERANT FIBER OPTIC PRESSURE TRANSDUCERS" filed on Mar. 8, 2007, which is hereby incorporated by reference in its entirety.

FIELD OF THE INVENTION

The present invention relates generally to apparatus and methods for monitoring gas turbine engines, and more particularly to apparatus and methods for monitoring combustion dynamics in gas turbine engines.

BACKGROUND OF THE INVENTION

Gas turbine engines typically include a compressor section or zone, a combustor section or zone, and a turbine section or zone. A compressor located in the compressor zone compresses air. This compressed air is mixed with fuel and channeled to the combustor zone. The air-fuel mixture is then ignited in a combustor or combustor can to generate hot combustion gases. These combustion gases expand and are channeled to the turbine zone to rotate the turbine. The rotation of the turbine generates mechanical energy that may be used to perform useful work such as, for example, powering an electrical generator or propelling an aircraft in flight.

Gas turbine engines are very versatile and may be pressed into operation in a wide variety of operating conditions. Because operating conditions may widely vary and may be unpredictable, it is desirable that the process of combustion in a gas turbine engine remains consistent and stable during operation. Instability in the combustion process may lead to undesirable results in a gas turbine engine, such as component failure and inefficient power generation. A stable combustion process typically reduces engine blowout while achieving expected thrust or power levels for the gas turbine engine. When a gas turbine engine is operated using dry low nitrous oxide techniques, combustion stability facilitates controlling nitrous oxide and carbon monoxide emissions. Because a stable combustion process is important to the efficient operation of a gas turbine engine, monitoring combustion stability during operation of a gas turbine engine is desirable.

SUMMARY OF THE INVENTION

Apparatus, methods, and other embodiments associated with monitoring combustion dynamics in a gas turbine engine environment are described herein. In one embodiment of a system for monitoring combustion dynamics in a gas turbine engine environment, the system includes a transducer and an optical fiber. The transducer is positioned within the gas turbine engine environment, and the transducer includes a diaphragm, a window, and a Fabry-Perot gap. The diaphragm has a reflective surface, and the window has a partially reflective surface. The Fabry-Perot gap is formed between the reflective surface of the diaphragm and the partially reflective surface of the window. The optical fiber is positioned proximate to the window and directs light into the Fabry-Perot gap and receiving light reflected from the Fabry-Perot gap.

DESCRIPTION OF THE DRAWINGS

Operation of the invention may be better understood by reference to the following detailed description taken in connection with the following illustrations, wherein.

DETAILED DESCRIPTION

Figure 1:
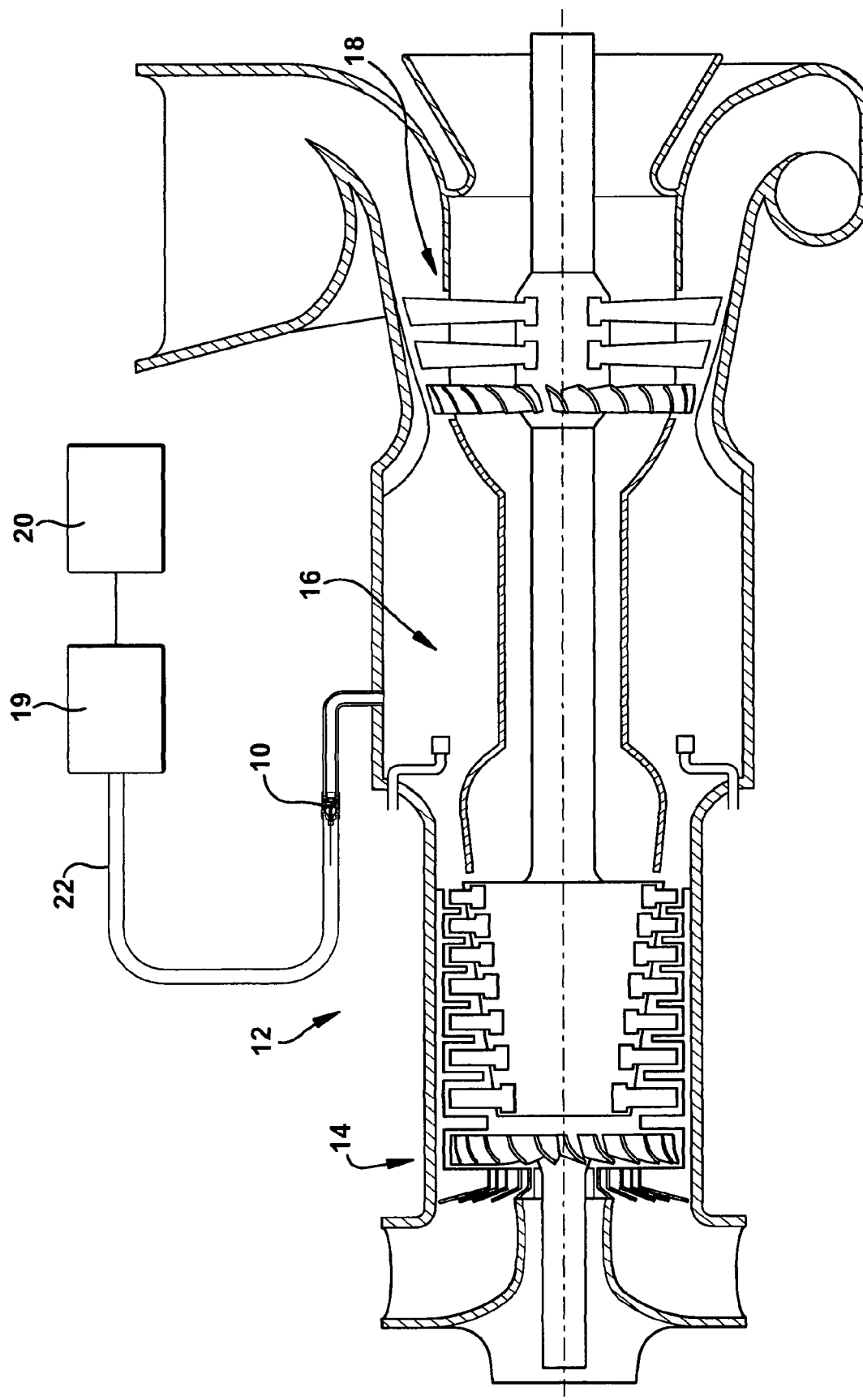
FIG. 1 schematically illustrates an embodiment of a fiber optic pressure pulsation transducer positioned within a gas turbine engine.

While the invention is described herein with reference to a number of embodiments and methods of use, it should be understood that the invention should not be limited to such embodiments or uses. The description of the embodiments and uses herein are illustrative only and should not limit the scope of the invention as claimed.

Apparatus for monitoring combustion dynamics in a gas turbine engine and methods of using such apparatus may be arranged such that the high temperatures experienced in an operational gas turbine engine environment do not damage the monitoring apparatus or cause the monitoring apparatus to inaccurately measure the combustion dynamics. In addition, such apparatus and method of use may be arranged to allow the monitoring apparatus to be located proximate to the combustion of air-fuel mixtures in the gas turbine engine without the monitoring equipment sustaining damage or producing inaccurate measurements.

Gas turbine engines are prone to a number of structural and system instabilities during the combustion of the air-fuel mixture within the engine. For example, when using low nitrous oxide techniques the gas turbine engine is typically supplied with a lean air-fuel mixture. Such a lean mixture may cause combustion instabilities such as oscillations, which may result in mechanical failures or even a shutdown of the gas turbine engine. Repeated oscillation in the gas turbine engine may cause combustor fatigue that often leads to early failure of the combustor, thereby reducing the service life of the combustor. In addition to early failure of the combustor, repeated oscillation may also cause other components in the turbine engine to fail.

In another example, low frequency dynamics, i.e., rumble, generally occurs in a gas turbine engine in the 1-50 Hz frequency range and may cause damage to gas turbine engine components if allowed to persist. Many gas turbine engines that are used for outdoor application and exposed to ambient temperatures may need seasonal tuning as the seasons change. Typically, as temperatures become cooler in the autumn and winter, a gas turbine engine may perform better if tuned to run leaner in the cooler and denser air. As the temperature begins to rise in the spring and summer, a gas turbine engine may perform better if tuned to run richer in the warmer and less dense air. The typical symptoms that signal that a gas turbine engine should be tuned to run leaner are lower output of nitrous oxide and an increase in low frequency dynamics or rumble. The monitoring of combustion dynamics in the gas turbine engine may detect such changes in low frequency dynamics or rumble and signal the need to properly tune the gas turbine engine.

Gas turbine engines are also susceptible to mid-frequency dynamics, generally in the 100-250 Hz frequency range and high frequency dynamics, i.e., screech, in the frequency ranges greater than 250 Hz. High frequency dynamics may be particularly destructive to gas turbine engine hardware. Gas turbine engines encountering high amplitude high frequency dynamics may see component failure in as little as a few minutes. The monitoring of combustion dynamics in the gas turbine engine may detect the presence of mid-frequency and high frequency dynamics and signal the need to shut down the gas turbine engine to prevent damage to the engine.

Combustion instabilities such as oscillation, low frequency dynamics, mid-frequency dynamics, and high frequency dynamics are responsible for the failure of a variety of gas turbine engine components such as, for example, fuel nozzles, combustor cans, and transition components. Such failures may include catastrophic failures such as a component breaking off and entering the gas path of the gas turbine engine. A metal, plastic, ceramic, or other such solid component traveling through the gas path ultimately encounters the rotating turbine during operation of the turbine and will likely cause irreparable damage and safety issues as the gas turbine engine fails.

The harmful effects of combustion instability are often revealed during periodic maintenance through visual inspection. When such visual inspection and/or failure analysis determines that critical components are damaged beyond safe limits, those parts are repaired or replaced adding to the maintenance cost and outage time. Damage to the components is generally caused by combustion instabilities. By continuously monitoring the combustion dynamics in a gas turbine engine, it is possible to detect the onset of damage, predict the extent of damage, minimize the cost of repairs to a gas turbine, lower harmful air emissions, and achieve higher rates of power generation from the capital employed. When combustion dynamics are continuously monitored, it is possible to determine when the gas turbine engine is operating at or near dangerous levels and warning signals may be delivered to the user or the engine may be turned down or shut down until corrective measures or preventive maintenance is completed. As will be illustrated and described herein, apparatus and methods may be arranged to continuously monitor the combustion dynamics of a gas turbine engine, analyze the combustion dynamics, and provide information and feedback regarding the performance of the gas turbine engine. In an embodiment, a transducer is positioned proximate to the combustion zone in a gas turbine engine to measure pressure pulsations due to combustion. Such pressure pulsation measurements may be used to analyze the combustion dynamics and diagnose potential unwanted behavior in the gas turbine engine.

FIG. 1 illustrates an exemplary embodiment of a pressure pulsation transducer 10 positioned within a gas turbine engine 12. The gas turbine engine 12 includes a compression zone 14, a combustion zone 16, and a turbine zone 18. In an embodiment, as shown, the pressure pulsation transducer 10 may be positioned proximate the combustion zone 16 of the gas turbine engine 12 so that the transducer 10 may measure pressure pulsations caused by instabilities in the combustion of the air-fuel mixture. The transducer 10 may be a temperature tolerant fiber optic transducer that measures pressure pulsations in the time domain. The transducer 10 may produce an optical signal that is delivered to an optical signal conditioner 19 through an optical fiber 22 coupled to the transducer 10 and the signal conditioner 19. The signal conditioner 19 may be located remotely from the gas turbine engine 12. The signal conditioner 19 may convert the optical signal to an electronic signal. This electronic signal may be delivered to an electronic signal processor 20 for further processing from the time domain to the frequency domain. The signal processor 20 may also be located remotely from the gas turbine engine 12. In another embodiment, the signal conditioner and signal processor may be combined into one component.

The signal processor 20 may analyze the frequency content of each pressure pulsation measured by the transducer 10. Such an analysis may compare the amplitude of the pressure pulsations to predetermined amplitude thresholds at various frequencies of interest. The predetermined amplitude thresholds may be based on the particular specifications and configuration of each gas turbine engines. These predetermined amplitude thresholds may represent amplitudes and frequencies at which damage to the engine is likely. If temporal analysis shows that the amplitudes at certain frequencies exceed the threshold or are increasing over time, it is an indication that undesirable combustion dynamics are occurring and damage to the gas turbine is likely unless certain corrective actions are taken, i.e. changing the air/fuel ratio. In such case, the signal processor 20 may deliver a warning to indicate that corrective measures should be taken to avoid damage to or failure of the engine 12. If certain amplitudes are reached at critical frequencies, the signal processor 20 may deliver a signal to the control system to shut down the engine 12 or take other actions to avoid damage to or failure of the engine.

Figure 2:
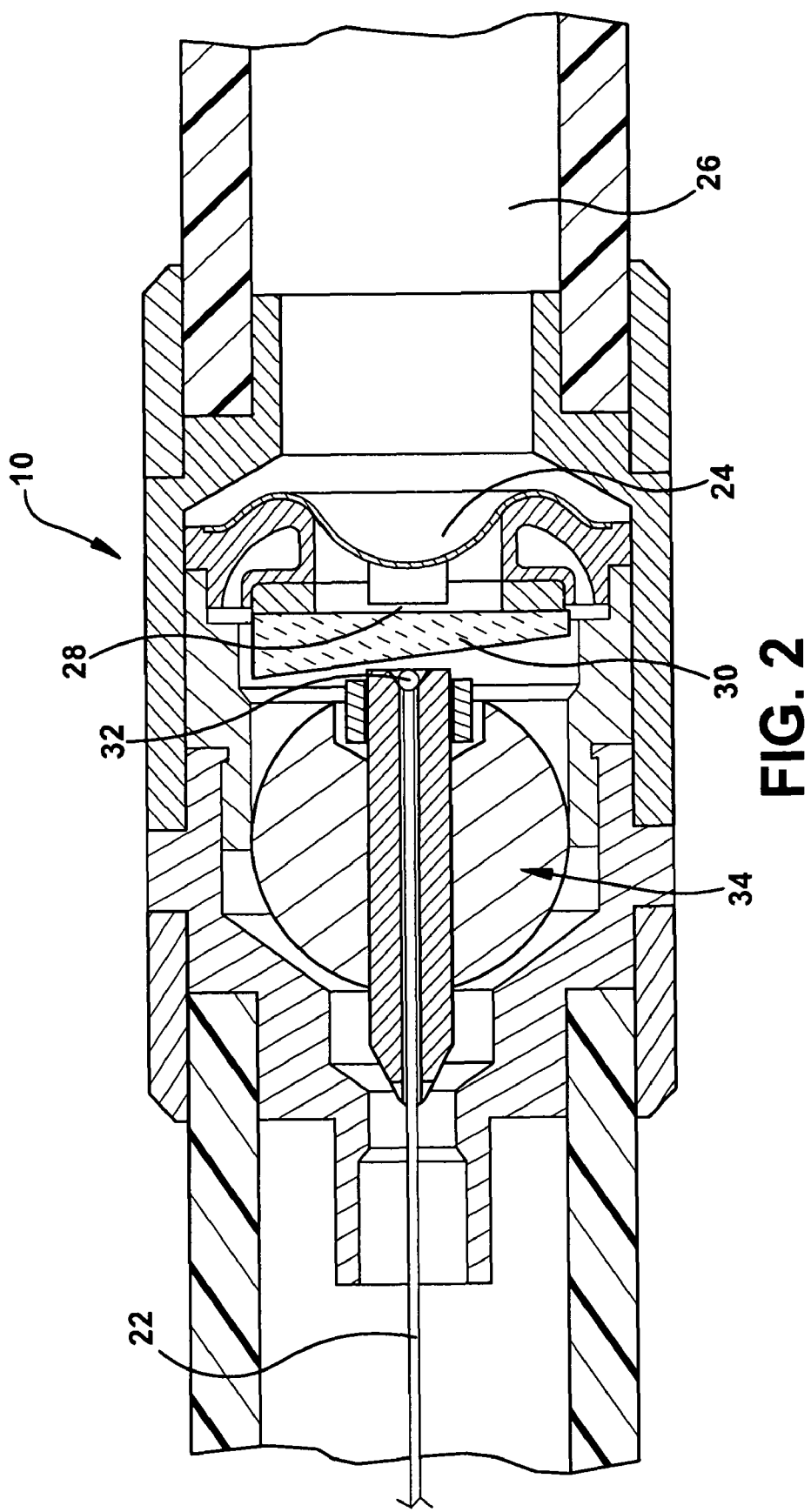
FIG. 2 illustrates an embodiment of a fiber optic pressure pulsation transducer with a short acoustic waveguide.

FIG. 2 schematically illustrates an embodiment of a fiber optic pressure pulsation transducer 10. The transducer 10 includes a diaphragm 24 that deflects in response to pressure pulsations in the gas turbine engine environment surrounding the transducer 10. An acoustic waveguide 26 may be positioned to extend from a front-side of the diaphragm 24 to eliminate noise from any other pressure variations that might arise from sources other than those caused directly by combustion dynamic instabilities. The front-side of the diaphragm 24 may be coated with a protective coating, such as gold, to reflect radiation generated by the combustion process.

The backside of the diaphragm 24 forms a reflective surface of a Fabry-Perot gap 28. An angled window 30 positioned just behind the diaphragm 24 forms a partially reflective surface of the Fabry-Perot gap 28. As the diaphragm 24 deflects in response to pressure pulsations, the length of the gap 28 changes. The monitoring and measuring of these changes to the length of the gap 28 may be analyzed to determine the properties of the pressure pulsations, and thus the properties of the combustion dynamics. The optical fiber 22 delivers light to the Fabry-Perot gap 28 through a ball lens 32 positioned at the end of the optical fiber 22. The light is modulated by the Fabry-Perot gap 28 to form modulated light. This modulated light is reflected back into the optical fiber 22. The reflected modulated light is delivered to the signal conditioner 19, which converts the optical signal to a time-based electronic signal that is delivered to the signal processor 20 for frequency analysis and determination of the properties of the combustion dynamics.

The end of the optical fiber 22 is positioned within a ball and sleeve alignment mechanism 34, which may be used to align the optical fiber 22 with the gap 28 to maximize the amount of light directed to the gap 28 and the amount of modulated light reflected back into the optical fiber 22. One surface of the window 30 is angled to eliminate unwanted reflection of unmodulated light back into the optical fiber 22. A second surface of the window 30 is positioned perpendicular to the path of light delivered from the optical fiber 22 and is the first surface of the Fabry-Perot gap 28. The backside of the diaphragm 24 is the second surface of the gap 28. Apparatus and methods of arranging reflective surfaces to form Fabry-Perot gaps and evaluating light reflected from those reflective surfaces are described in U.S. patent application Ser. No. 11/377,050 to Lopushansky et al., entitled "High Intensity Fabry-Perot Sensor;" and U.S. patent application Ser. No. 12/011,057 to Lopushansky, entitled "Transducer For Measuring Environmental Parameters," both of which are hereby incorporated by reference in its entirety.

In an embodiment, the acoustic waveguide 26 may be relatively short. For example, the waveguide 26 may be approximately one-half inch long. As discussed above, the waveguide 26 may eliminate noise from any other pressure variations that might arise from sources other than those caused directly by combustion dynamic instabilities. Noise may be produced by the dilution airflow or from acoustic disturbances caused by flow geometries within the combustor or combustor can. A relatively short acoustic waveguide 26 may also keep the diaphragm 24 and other sensor components in the convection zone of the relatively cool dilution air, e.g., 425° C., inside the combustion zone of the gas turbine engine.

The performance of a relatively short acoustic waveguide 26 may be modeled as a resonant quarter-wave tube. The resonance of a tube of air is related to the length of the tube, its shape, and whether it has closed or open ends. The acoustic waveguide 26 shown in FIG. 2 has one open end and one end closed by the diaphragm 24. Vibrating air columns have resonances at harmonics, and a cylindrical tube with one closed end has resonant acoustic frequencies (f) given by:

$$f_n = nv/4L \quad (1)$$

where n=1, 3, 5, etc., v is sound velocity, and L is the length of the tube. A stopped cylindrical tube produces only odd harmonics, f, 3f, 5f, etc. In one embodiment, the minimum temperature in the environment of the pressure pulsation transducer 10 is 400° C. The speed of sound, v, in air at 400° C. is 520 meters per second and increases as temperature increases. From Equation 1, $$f_n = n(520 m/s)/4L \text{ at 400 degrees Celsius} \quad (2)$$

In an embodiment, the diaphragm 24 of the pressure pulsation transducer 10 is preferably positioned to be no more than one-half inch away from the acoustic access point in the combustor. Because the waveguide 26 is resonant at specific frequencies, sound energy within the waveguide is reflected back and forth between the open end of the waveguide 26 and diaphragm 24. The precise location at which sound energy is reflected is dependent on factors such as tube diameter, wavelength of the sound, and the configuration of the opening at the end of the waveguide 26, e.g., straight, conical, or flared.

Figure 3:
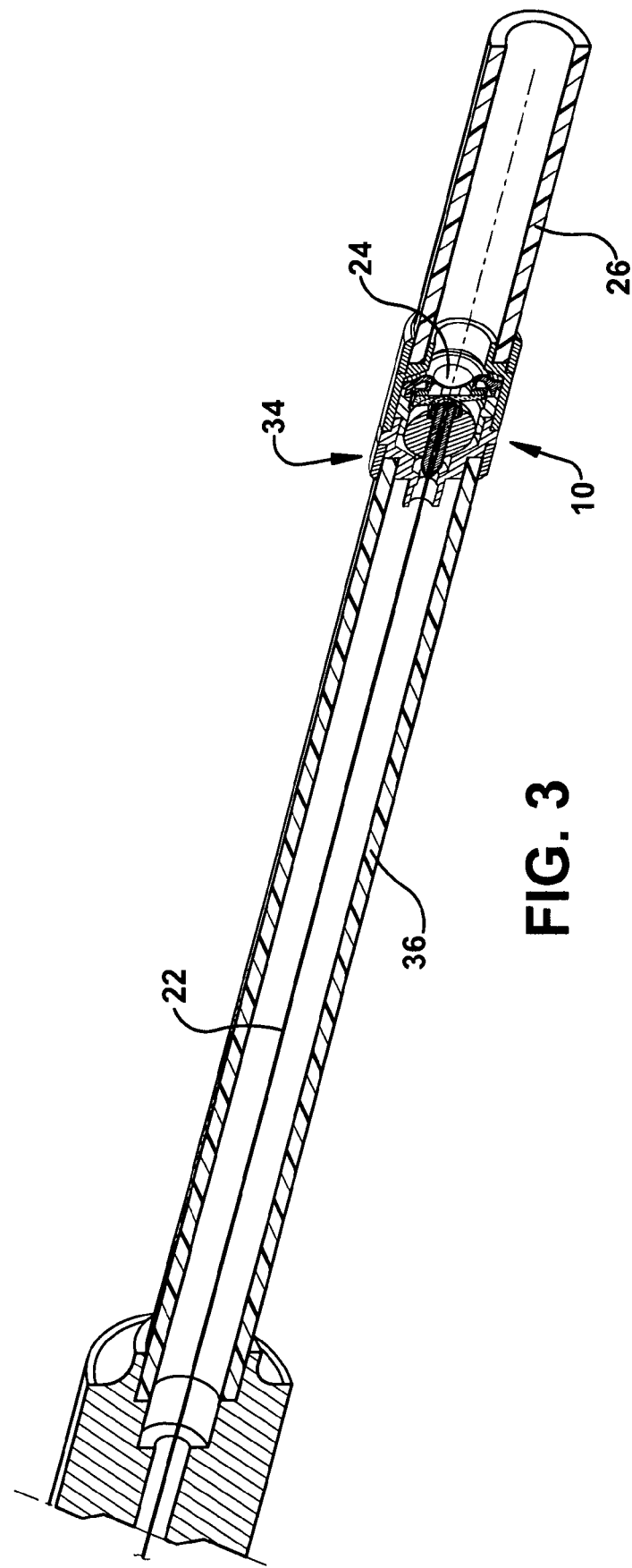
FIG. 3 illustrates an embodiment of a fiber optic pressure pulsation transducer near the end of a long flexible tube with a short flexible acoustic waveguide.

FIG. 3 schematically illustrates another embodiment of a fiber optic pressure pulsation transducer 10. In the embodiment illustrated in FIG. 3, a relatively long tube 36 extends from the transducer 10 and encloses the optical fiber 22. This embodiment also includes a relatively short acoustic waveguide 26. The tube 36 and waveguide 26 may be constructed from flexible materials so as to facilitate positioning of the transducer 10 within a gas turbine engine 12.

For example, a long flexible tube 36 may enable positioning the transducer 10 within an existing pressure port of a gas turbine engine 12. Such pressure ports are often located near the inside surface of a combustor, outside the combustion liner but within the region of dilution air near the combustion zone 16 of the engine 12. A long flexible tube 36 may also facilitate the attachment of a transducer 10 to the inner surface of the combustor can in the engine 12. Some gas turbine engines 12 are arranged such that internal combustor components, such as the internal liner, move independently from the outside casing of the combustor. Therefore, the transducer 10, which is may be rigidly secured to the outside surface of the engine, must be compliant so that relative movement caused by the thermal expansion of the internal liner and other combustor components does not damage the transducer 10. Without a flexible or compliant tube 36, the transducer 10 may be damaged or even sheared off during engine operation as components move relative to one another due to thermal expansion.

A flexible waveguide 26 similarly facilitates positioning and securing of the transducer 10 within a gas turbine engine 12. For example, an engine 12 may be arranged with a J-tube. The transducer 10 may be positioned within the J-Tube. Such positioning is facilitated by a flexible acoustic waveguide 26.

Figure 4:
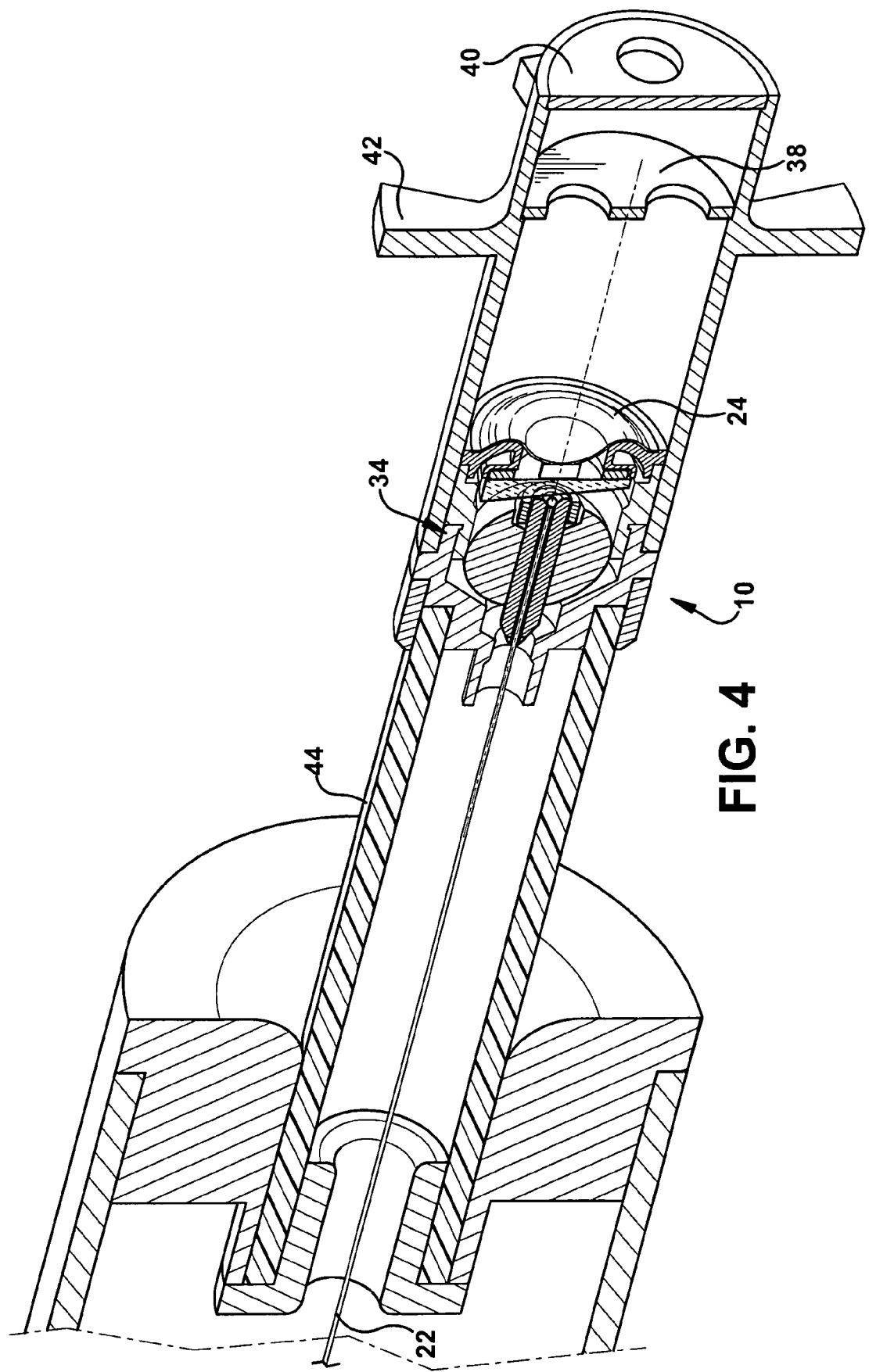
FIG. 4 illustrates an embodiment of a fiber optic dynamic pressure pulsation transducer with a radiation barrier, flame shield, and guide stop.

FIG. 4 schematically illustrates another embodiment of a fiber optic pressure pulsation transducer 10. The embodiment includes a radiation barrier 38, a flame shield 40, and a guide stop 42. The radiant barrier 38 and flame shield 40 protect the diaphragm 24 from radiant heat, flames, and hot combustion gases commonly found in the combustion zone 16 of an engine 12. The guide stop 42 facilitates the proper positioning of the transducer 10 within an engine 12. For example, if it is preferable to install the transducer 10 at the inner liner of an engine 12, the guide stop 42 may be arranged to prevent the transducer 10 from being installed beyond the internal liner and assure that the sensing elements of the transducer 10 remain in the convection zone cooled by dilution air.

The transducer 10 illustrated in FIG. 4 also includes a relatively short flexible tube 44 enclosing the optical fiber 22 and a flexible acoustic waveguide 26. It will be understood by those skilled in the art that a transducer may be coupled to a relatively long or relatively short tube that encloses the optical fiber, and that such a tube may be flexible or rigid. In addition, a transducer may be coupled to a flexible or rigid waveguide, and such a waveguide may vary in length.

In an embodiment, a method is provided for monitoring and analyzing the combustion dynamics of a gas turbine engine 12. Such a method may include mounting at least one fiber optic pressure pulsation transducer 10 near the combustion zone 16 of the engine 12 so that the transducer 10 is positioned near at least one combustor or combustion can of the engine 12. The fiber optic transducer 10 may be arranged to be generally tolerant of relatively high temperatures, and specifically tolerant to temperatures up to approximately 530° C. The fiber optic transducer 10 may be arranged to be generally sensitive to small changes in pressures, and specifically arranged to be sensitive to dynamic pressure of plus or minus 10 pounds per square inch. The fiber optic transducer 10 may be arranged to be generally insensitive to static pressure, shock and acceleration. For example, the transducer may be arranged to be insensitive to static pressures of up to 750 pounds per square inch, shocks of up to 1000 g, and acceleration. The cross-sensitivity of transducer 10 to acceleration is typically a relatively low 0.001 psi/g.

In another embodiment, a system for monitoring combustion dynamics includes at least one fiber optic transducer 10 located near the combustion zone 16 of an engine 12 and located near the combustion can of the gas turbine engine 12. The transducer 10 is temperature tolerant and senses pressure pulsations, i.e., thermo-acoustic oscillations. The transducer 10 includes a Fabry-Perot gap 28 that dynamically reacts to the pressure pulsations. An optical fiber 22 may direct light to this gap 28, and the gap 28 may modulate and reflect this light back into the optical fiber 22. This modulated light may be transmitted through the optical fiber 22 to a signal conditioner 19 located outside or remote to the engine 12. The signal conditioner 19 may convert the modulated light signal into an electronic signal and sent to an electronic signal processor 20 such as, for example, a spectrum analyzer. The spectrum analyzer may convert time domain amplitude signals into frequency domain amplitude signals, e.g., signals representative of the combustion dynamics.

In another embodiment, a system for monitoring combustion dynamics includes mounting a plurality of fiber optic pressure pulsation transducers 10 inside the combustion zone 16 of a gas turbine engine system with multiple combustors and combustor cans. A transducer 10 may be positioned near the combustion zone of each of the combustors in a gas turbine engine system or multiple transducers 10 may be positioned near the combustion zone of each of the combustors in a gas turbine engine system. Optical signals produced by each transducer 10 may be directed to a dedicated signal conditioner 19. This plurality of signal conditioners 19 may in turn each be coupled to a dedicated signal processor 20 to convert the time domain amplitude signals into frequency domain amplitude signals. This collection of frequency domain amplitude signals may further be compared and analyzed to evaluate the performance and efficiency of the gas turbine engine system.

In another embodiment, a system for monitoring combustion dynamics includes at least one fiber optic pressure pulsation transducer 10 mounted near the combustion zone 16 near at least one combustor in a gas turbine system 12. The transducer 10 is coupled to at least one signal conditioner 19, which is coupled to at least one signal processor 20. The signal processor 20 is connected to at least one data acquisition system. The data acquisition system is configured to receive signals from the signal processor 20 and quantitatively store combustion dynamic signals generated from at least one combustor within the gas turbine engine 12. The data acquisition system may store data from the combustion dynamic signals in any physical or logical entity that can store data such as, for example, a database, a table, a file, a list, and the like.

The data acquisition system may determine and display a maximum, minimum, and average pressure levels in a combustor over specific periods of time. Such average levels or individual maximums or minimums may be compared to threshold levels characteristic of the specific gas turbine engine being monitored. If the maximums or minimums fall above or below thresholds, an alarm or warning may be generated to show that unacceptable combustion instability has occurred or may soon occur.

Maximums, minimums, and average pressure levels may be displayed on video screens, on paper graphs, or through any other method that may relay information to a user of the system. Alarms or warnings may be similarly displayed through any method that may relay information to a user such as, for example, video screens, paper reports, electronic mail messages, lights, sirens, and the like.

The analysis of signals and the generation of warnings and alerts may be accomplished by combustion dynamics monitoring software implemented to examine specific frequencies, amplitudes, and threshold levels; archive data; and provide operator displays that provide a variety of indicators of combustion dynamics.

In another embodiment, a system for monitoring combustion dynamics includes a plurality of fiber optic pressure pulsation transducers 10, signal conditioners 19, and signal processors 20 coupled to at least one data acquisition system. Signals generated are analyzed by combustion dynamics monitoring software. The data acquisition system and software display a map of the instrumented combustors and plot the amplitude versus frequency for each combustor. When a threshold is exceeded for any combustor, the monitoring software displays or otherwise relays an alarm indicator to a user of the system. Alternatively, when a threshold is exceeded for any combustor, that combustor or the entire system may be shut down to prevent damage to system components or other injury.

The embodiments as described herein and variants of such embodiments may also be integrated with a gas turbine engine control system to provide automatic tuning of the air-fuel mixture to minimize nitrous oxide emissions, maximize operating efficiency, and minimize the potential for catastrophic damage to critical turbine components.

The invention has been described above and modifications and alternations will occur to others upon a reading and understanding of this specification. The claims as follows are intended to include all modifications and alterations insofar as they come within the scope of the claims or the equivalent thereof.

Having thus described the invention, we claim:

1. A system for monitoring combustion dynamics in a gas turbine engine environment, the system comprising:
    a transducer positioned within the gas turbine engine environment, the transducer comprising:
        a diaphragm with a reflective surface; a window with a partially reflective surface; and
        a Fabry-Perot gap formed between the reflective surface of the diaphragm and the partially reflective surface of the window; and
    an optical fiber positioned proximate to the window for directing light to the Fabry-Perot gap and receiving light reflected from the Fabry-Perot gap.

2. The system of claim 1, further comprising an acoustic waveguide having a first end and a second end, where the first end is positioned proximate to the diaphragm and the second end is open to the gas turbine engine environment.

3. The system of claim 2, where the acoustic waveguide comprises at least one guide stop.

4. The system of claim 2, further comprising a flame shield positioned proximate to the second end of the acoustic waveguide.

5. The system of claim 2, further comprising a radiation barrier positioned within the acoustic waveguide.

6. The system of claim 1, further comprising a flexible tube enclosing the optical fiber.

7. The system of claim 1, further comprising a ball and sleeve assembly mechanism engaged with the optical fiber.

8. The system of claim 1, further comprising a signal conditioner coupled to the optical fiber for converting an optical signal to an electronic signal.

9. The system of claim 8, further comprising a signal processor coupled to the signal conditioner.

10. The system of claim 9 where the signal processor is a spectrum analyzer.

11. The system of claim 1, where the optical fiber further comprises a ball lens positioned proximate to the Fabry-Perot gap.

12. The system of claim 1, where the window further comprises an angled surface positioned proximate to the optical fiber.

13. A method for monitoring combustion dynamics in a gas turbine engine environment comprising:

positioning a pressure pulsation transducer within the gas turbine engine environment, the pressure pulsation transducer comprising a diaphragm, a window, and a Fabry-Perot gap formed between the diaphragm and the window;

positioning an optical fiber proximate to the Fabry-Perot gap;

operating the gas turbine engine;

directing light from the optical fiber to the Fabry-Perot gap;

modulating light with the Fabry-Perot gap to form modulated light;

directing the modulated light into the optical fiber; and providing the modulated light to a signal conditioner.

14. The method of claim 13, further comprising positioning the pressure pulsation transducer proximate to the combustion zone of the gas turbine engine environment.

15. The method of claim 13, further comprising arranging the pressure pulsation transducer to be tolerant of temperatures of at least 300 degree C.

16. The method of claim 13, further comprising determining a threshold value for acceptable combustion dynamics of the gas turbine engine environment.

17. The method of claim 16 further comprising:
converting the modulated light to a time domain amplitude electronic signal; and
providing the time domain amplitude electronic signal to a signal processor for conversion to a frequency domain amplitude signal.

18. The method of claim 17, further comprising comparing the frequency domain amplitude signal to the threshold value; and providing a warning signal if the frequency domain amplitude signal is approaching the threshold value.

19. The method of claim 17, further comprising:
providing the frequency domain amplitude signal to a data acquisition system;
storing values from the frequency domain amplitude signal in a database;
calculating minimum pressure levels; calculating maximum pressure levels; and
calculating average pressure levels.

20. The method of claim 19, further comprising displaying at least one of the calculated pressure levels on a display screen.

21. A system for monitoring combustion dynamics during gas turbine engine power generation, the system comprising:
a plurality of gas turbine engines, where each gas turbine engine comprises a combustion zone;
a plurality of transducers, each transducer positioned proximate to the combustion zone of one of the plurality of gas turbine engines, each transducer comprising: a diaphragm with a reflective surface;
a window with a partially reflective surface; and
a Fabry-Perot gap formed between the reflective surface of the diaphragm and the partially reflective surface of the window; and an plurality of optical fibers, each optical fiber positioned proximate to the window of one of the plurality of transducers for directing light to the Fabry-Perot gap and receiving light reflected from the Fabry-Perot gap.

22. The system of claim 21, further comprising a plurality of acoustic waveguides, each acoustic waveguide having a first end and a second end, where the first end is positioned proximate to the diaphragm of one of the plurality of transducers and the second end is open to the combustion zone of one of the plurality of gas turbine engines.

23. The system of claim 22, further comprising a plurality of flame shields, each flame shield positioned proximate to the second end of one of the plurality of acoustic waveguides.

24. The system of claim 22, further comprising a plurality of radiation barriers, each radiation barrier positioned within one of the plurality of acoustic waveguides.

25. The system of claim 21, further comprising a signal conditioner coupled to the plurality of optical fibers for converting a plurality of optical signals to a plurality of electronic signals.

26. The system of claim 25, further comprising a signal processor coupled to the signal conditioner.

27. The system of claim 26 where the signal processor is a spectrum analyzer.

* * * * *